Oct. 25, 1955 B. M. OLIVER 2,721,900

NON-LINEAR ENCODED TRANSMISSION

Filed June 29, 1950 2 Sheets-Sheet 1

INVENTOR
B. M. OLIVER
BY Hugh S. Wertz
ATTORNEY

Oct. 25, 1955 B. M. OLIVER 2,721,900

NON-LINEAR ENCODED TRANSMISSION

Filed June 29, 1950 2 Sheets-Sheet 2

INVENTOR
B. M. OLIVER
BY Hugh S. Wertz
ATTORNEY 2,721,900

NON-LINEAR ENCODED TRANSMISSION

Bernard M. Oliver, Morristown, N. J., assignor to Bell Telephone Laboratories, Incorporated, New York, N. Y., a corporation of New York Application June 29, 1950, Serial No. 170,979

10 Claims. (Cl. 179—15.6)

This invention relates to wide band transmission systems and, more particularly, to encoding methods and apparatus of value in certain improvements in said systems.

It can readily be shown, by the application of certain principles of statistical mechanics to communication theory, that most present-day communication systems employ a channel capacity greater than that which is actually necessary to describe the message. That is, present-day systems provide sufficient channel capacity to transmit successive samples of a given message which are completely independent of each other, whereas typical communication message samples (e. g., speech, music, or television) exhibit a considerable degree of interdependence or correlation—semantic, spatial (in television, for example), temporal, etc. By taking advantage of this correlation, the requisite channel capacity of a system can be materially lessened, and to the extent that this correlation is not made use of, the system is inefficient. One technique for utilizing the limitation of freedom of choice which is exhibited by most communication signals is to employ a statistical compendium, as it were, of the probabilities of occurrence of any given signal and to adapt the transmission system to accommodate preferentially those signals which are most probable of occurrence.

It is thus the principal object of the present invention to reduce the channel capacity required for wide band transmission by encoding message samples in terms of probabilities of occurrence rather than in terms of amplitude, or one of the other parameters commonly employed in the systems now in general use.

In one aspect, the present invention comprises a novel method of transmission wherein a message wave is sampled at certain predetermined intervals for forming a succession of sample pulses. The amplitude of a number of sample pulses preceding an instant sample is then detected and utilized to select for the instant sample a particular coding function from a series of coding functions. A code sample pulse comprising the instant sample as modified by the particular coding characteristic is then transmitted. The transmitted code sample pulses are then received and after decoding a facsimile of the message wave is derived.

In a second aspect, the present invention consists primarily of a non-linear computer which encodes on the basis of statistical information as to the probability of occurrence of a particular sample amplitude. In one simple illustrative embodiment, hereinafter designated a "monogrammer," the message samples are applied to the deflection plates of a cathode-ray tube so as to deflect the spot successive positions on the fluorescent screen corresponding to possible message sample amplitudes. In front of the screen there is a mask having areas with different optical transmission factors, each area corresponding to one of these spot positions. Each transmission factor corresponds to a possible signal sample amplitude and is ordered in accordance with the probability of occurrence of the corresponding message sample amplitude. The light transmitted by these areas as the spot falls behind them in succession is picked up by a photocell and constitutes the transmitted signal. A similar device at the receiver converts the probability-representative signal pulse amplitudes into signals proportional to the original message sample amplitudes.

It is evident that the probable choices for the next sample are further limited by the previous sample amplitude. That is, if the previous sample amplitude is known, there may be only a few likely choices for the next amplitude. Thus, another exemplary embodiment of the invention comprises an encoding means similar to that described, but extended into two dimensions. This arrangement, hereinafter designated a "digrammer," as well as trigram, tetragram, and in general *n*-gram structures, provide a further increase in transmission efficiency.

The invention will be more fully understood by referring to the following detailed description taken in connection with accompanying drawings forming a part thereof, in which.

Figures 1, 2:
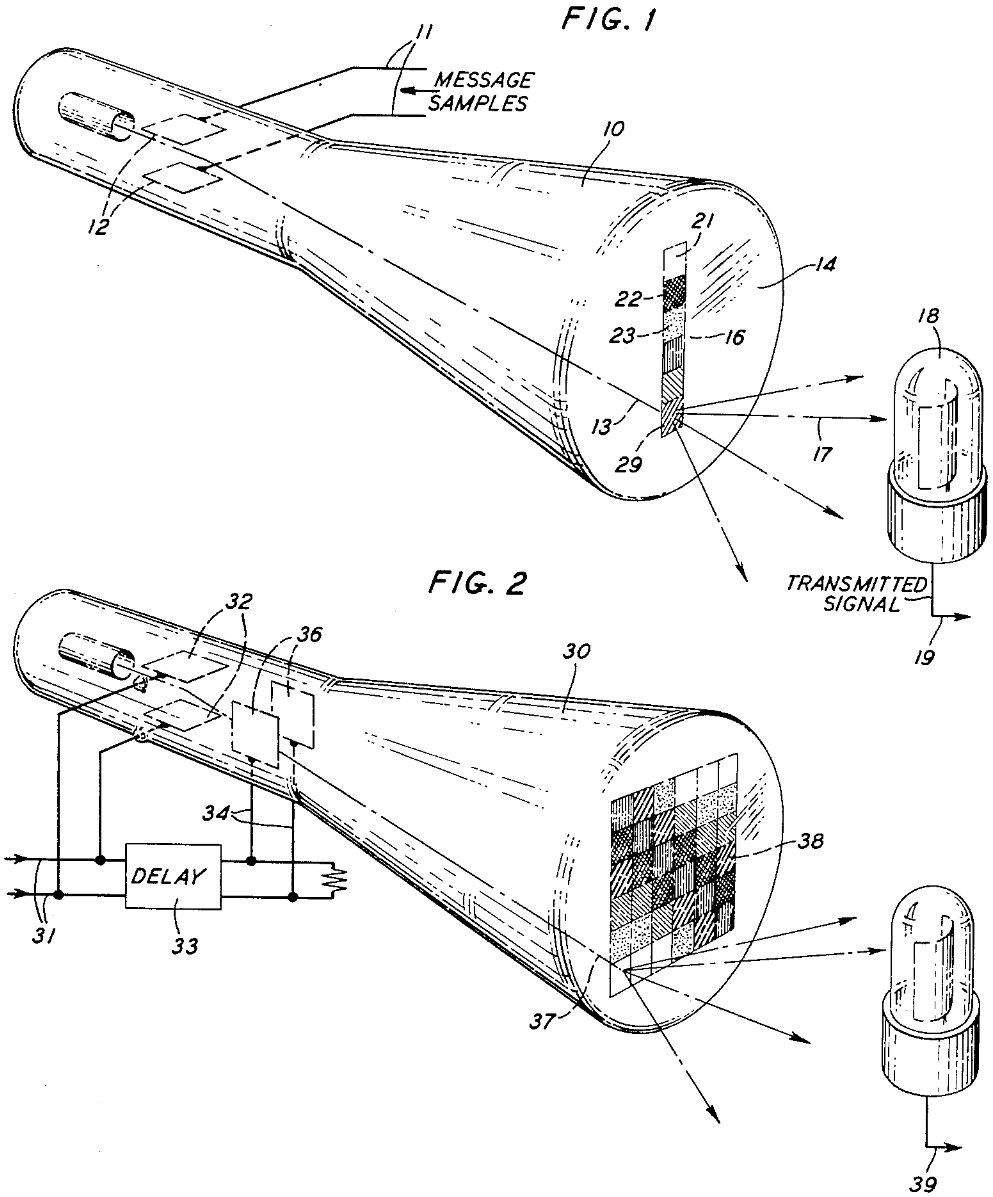
Fig. 1 shows a simple illustrative embodiment of the so-called "monogrammer"
Fig. 2 illustrates a simple illustrative embodiment of the so-called "digrammer"

It will facilitate the exposition of the mode of operation of the arrangement of the invention shown in Fig. 1 to state certain matters in general before referring specifically to that figure. Let it thus be assumed that the subject to be transmitted is a message consisting of discrete characters. Such a message might, for example, be English text or the quantized samples of a television signal or of a speech signal. If the successive characters or samples are independently chosen and if the occurrence of each character is equiprobable, a fairly efficient method of transmission is to generate for each sample a pulse of corresponding amplitude and then to transmit this succession of pulses. As an illustration, if a particular sample is of amplitude 10, then a pulse of amplitude 10 units is sent.

If, however, the occurrence of each character is not equiprobable, a direct correspondence of pulse amplitude with sample amplitude may be of small efficiency. It is advantageous, in such a situation, to represent the most probable character by pulse amplitude 0, the next most probable character by pulse amplitude 1, etc. The enhanced efficiency of this technique stems from the obvious fact that a pulse amplitude of 0 requires a minimum power for its transmission, the requisite power increasing with the pulse amplitude. An instructive example is afforded by English language text. A simple but not very efficient method is to let $A=1$ (pulse of unit amplitude), $B=2$ (pulse of amplitude 2), $C=3$, $D=4$, etc. With probabilities of occurrence determining pulse amplitudes, the code would more closely resemble the following: space (no letter or punctuation mark) = zero (no pulse), $E=1$, $T=2$, $A=3$, $0=4$, etc. This manifestly is a non-linear encoding operation and its effectuation by linear means is in general not possible.

In Fig. 1, however, there is shown a non-linear device which accomplishes this operation. The message samples 11 are applied to the deflection plates 12 of a cathode-ray tube 10 and cause the spot 13 to be deflected to successive positions on the fluorescent screen 14 corresponding to possible sample amplitudes. In front of the screen there is a mask 16 having areas 21, 22, . . . , 29, each with a different optical transmission factor. The light 17 transmitted by these areas as the spot falls behind them in succession is picked up by a photocell 18 and is transformed into the transmitted signal 19. Thus, again considering the illustration where the samples have ten possible amplitudes, opposite the spot position corresponding to the most probable amplitude the mask is made opaque, opposite the next most probable position the mask is given transmission one-ninth, etc. Although the message sample amplitudes as well as the signal pulse amplitudes are, in accordance with the invention, normally spaced in equal amplitude steps, it is obvious that this is not necessary in order for the device to operate properly and therefore it is not essential to the practice of the invention.

At the receiver, the received pulse amplitudes are applied to a device which is similar to that described above but in which the mask is so disposed as to convert the signal pulse amplitudes back into the original signal message amplitudes. It is evident then that it is within the scope of the invention to perform both the encoding and decoding operations by the same basic device with merely a change in mask.

The efficiency of the "monogrammer" which has been described derives from purely simple probability considerations and does not take advantage of any interdependence which may exist among the message samples. Since, however, most communication message samples exhibit a considerable degree of interdependence, a further increase in transmission efficiency is afforded by utilizing digram, trigram, and in general *n*-gram structures. In the common situation that the message samples are not independent, if the previous sample amplitude is known there may be only a few likely choices for the next sample, so that the efficiency of the relative-improbability-code is enhanced. To return, for purposes of illustration, to the example of English language text, it is a notorious fact that the letter Q is almost always followed by the letter U, while after the U another vowel is very likely. (It is to be noted that the letter Q is not inevitably followed by the letter U, as witness the above sentence and this one.) To the extent that the past samples of a message make all but a few values for the next sample extremely unlikely, the transmitted signal can be made to consist primarily of small amplitude pulses with occasional extremely unlikely large pulses. To achieve this, the pulse amplitudes are, in accordance with the invention, assigned to represent the next sample on the basis of the conditional probability distribution (conditioned on the particular past history) rather than on the basis of the simple probability distribution (as in the monogrammer).

An embodiment of the invention which makes full use of digram structure is shown in Fig. 2. The device shown in that figure, a so-called "digrammer," is an extension of the above-described monogrammer into two dimensions. The signal samples 31, which have been suitably quantized, are, in the exemplary arrangement being described for purposes of illustration, applied to the vertical deflection plates 32 of a cathode-ray tube 30, and some suitable sample 34 from the past, obtained as the output of a delay line 33, is simultaneously applied to the horizontal deflection plates 36. In a typical arrangement, the delay means 33 has a delay equal to the sampling interval, so that as each quantized sample 31 appears on the vertical plates, the immediately preceding quantized sample 34 simultaneously appears on the horizontal plates. The spot 37 is thereby deflected to a column on the mask 38 determined by the immediately preceding sample and to a row determined by the present sample amplitude. The transmissions of the several cells in each column are arranged in accordance with the conditional probabilities of occurrence $p_i(j)$—i. e., the probability that if the last sample was $i$ the next is $j$. Each column need, therefore, at most contain as many squares having different transmission features as there are sample amplitudes, and may contain fewer if the past excludes certain ones.

To reconstruct the message out of the signal 39 transmitted from this digrammer device, it is in accordance with the invention to employ a second device of the same type, with a change in mask similar to the change involved in the monogrammer system, described above. In the receiver, the received signals are applied to one set of deflection plates and the previous sample (as already reconstructed at the receiver) is applied to the other set of plates.

An iteration of devices similar to those described is within the scope of the invention so that higher order statistical structure may be partially taken into account. In many instances of operation, the signal out of the first digrammer tube may show some sample-to-sample correlation. This signal can then be treated as another type of message and applied to a second digrammer. The further gain in transmission efficiency which results is somewhat analogous to that obtained by extension of linear prediction to more samples in the past, as discussed in my copending application, Serial No. 170,978, filed June 29, 1950, which has issued as U. S. Patent No. 2,701,274.

In order to take full account of trigram structure, it is within the practice of the invention to utilize an array of digrammers. With, for example, ten quantizing levels, it is in accordance with the invention to use the level from another sample in the past to switch into operation one of an array of ten digrammers, each of which has the optimum code plate or mask corresponding to the statistics imposed by the existence of that amplitude in that sample.

Figure 3:
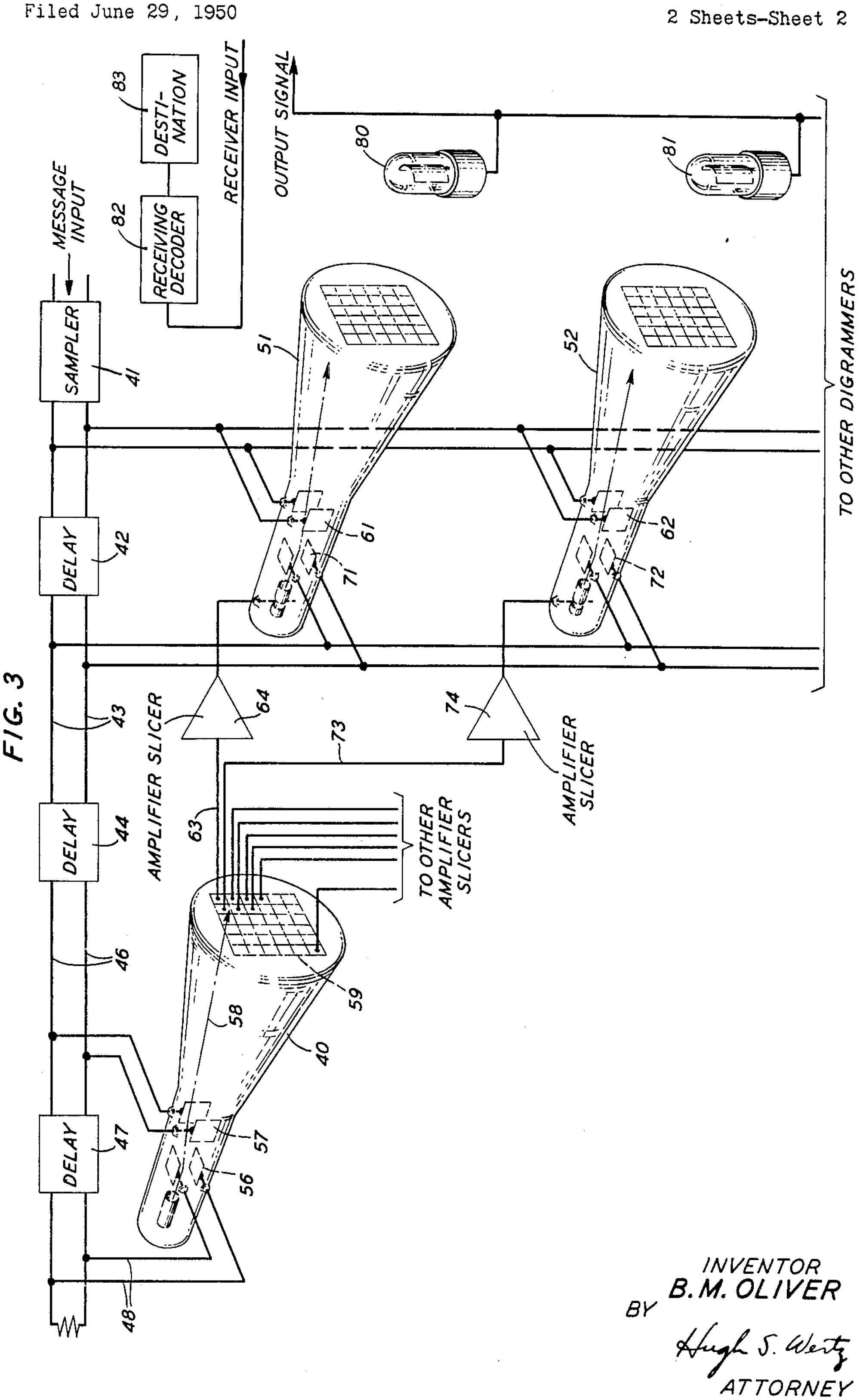
Fig. 3 shows a representative embodiment of the so-called "tetragrammer."

In Fig. 3, there is illustrated an exemplary arrangement suitable for making use of tetragram structure. Let us suppose, for purposes of illustration, that there are $n$ quantizing levels. The samples from the sampler 41, which have been suitably quantized, are applied to one pair of deflecting plates 61, 62, etc. of $n^2$ digrammers 51, 52, etc. Delaying means 42 delays these samples by, for example, one sampling time, and the delayed samples 43 are applied (simultaneously with the undelayed samples) to the other pair of deflecting plates 71, 72, etc. of the $n^2$ digrammers 51, 52, etc. Only one of these digrammers is, however, active at one time, and which one it is depends on the particular combination of two other samples from the past as obtained from the delay chain. The series of samples 46, further delayed by delaying means 44, and the series of samples 48, also delayed by delaying means 44 and still further delayed by delaying means 47, are applied, respectively, to deflecting plates 56 and 57 of a cathode-ray switching tube 40 so that the electron beam 58 strikes one of $n^2$ electrodes 59. The current 63 from this electrode is amplified and sliced in an amplifier slicer 64, of a type which is well known in the art, and this slicer output then turns on the electron beam in the proper digrammer, which for the sample being discussed is digrammer 51. Similarly, if current 73 is produced, it is operated on by amplifier slicer 74 and activates digrammer 52; and the other digrammers are, if they are to be made active, energized in the same manner by an output current from the cathode-ray switching tube 40, as indicatetd schematically in the figure.

At the receiving station, the received input signal from the transmitter photocells 80, 81 etc. is applied to a decoder 82 which is basically the same device as the arrangement at the transmitter except that the masks are inversed with respect to the corresponding ones of the transmitter. The output of the decoder 82 is applied to any suitable message destination 83.

In the common example of practice in which the signal samples from the sampler 41 represent a television image picture, it is in accordance with a preferred embodiment of the invention to make delaying means 42 and 47 equal to the time between successive elements, while delaying means 44 is made equal to the time between successive lines (less perhaps one or two elements).

In the digrammer which was described above, it is of course not necessary to use a phosphor, an optical mask, and a photocell. It is within the scope of the invention to construct that tube in the same manner as the switching tube 40 shown in the tetragrammer of Fig. 3. In this embodiment of the invention, each of the electrodes 59 should be connected to an appropriate tap on a load resistor. It should, however, be seated that the optical arrangement of the digrammer appears to be somewhat simpler and more flexible, particularly since standard cathode-ray tubes (with short phosphor decay times) can be used.

It is manifest that the digrammer is essentially a two-entry function table. That is, the current out is a function of two independent variables: $i=f(x, y)$. Regarded as such, the basic structure has many other applications which are within the ambit of the invention. For example, the two inputs can be pairs of samples of a signal and the output a series of pulses, each pulse representing an input pair. If there were $n$ quantizing levels in the input, there would ordinarily be $n^2$ in the output, although some of these might be excluded or so improbable that they could be omitted.

In one example of practice, the device can be used simply as a function table in a computing machine. In this application, the inputs and outputs need not necessarily be quantized, and the device produces as its output a continuous (or discontinuous) function of two continuous variables.

Another use to which the digrammer can be put is in the remapping of blocks of a PCM signal into a more efficient code by taking the existing signals, sections of which, $n$ pulses in length, would lie in a cubical lattice in $n$-dimensional function space, and transforming them into points with a better packing factor.

The device can, moreover, be employed to advantage in secrecy systems. If an initial digramming or trigramming operation is performed on English language text, a good part of the redundancy is removed. Thus, succeeding scrambling operations (which can also be performed by a digrammer) are of enhanced effectiveness as ciphering means. A trigrammer, for example, followed by a transposition cipher is simply one illustration of the manifestly powerful secrecy systems which are possible with the present invention. Further advantages of such a secrecy system are that the system is fast, can be used for speech, and, since it can be altered frequently by changing code plates, it is flexible.

It is to be understood that the above-described arrangements are illustrative of the application of the principles of the invention. Numerous other arrangements may be devised by those skilled in the art without departing from the spirit and scope of the invention.

What is claimed is:

1. In a transmission system in which the message wave is periodically sampled, encoding means comprising a cathode-ray device which includes means for producing an electron beam, two sets of beam deflecting means arranged in space quadrature and a fluorescent screen, means at any instant for delaying a message wave sample by at least one sampling period, means for applying an undelayed sample to one set of deflecting means and means for applying a delayed sample to another set of deflecting means such that said electron beam is deflected to a position on said fluorescent screen corresponding in one coordinate to the amplitude of the undelayed message wave sample and in another coordinate to the amplitude of the delayed message wave sample, a masking means located beyond said fluorescent screen and divided into discrete areas, said areas having differing optical transmission factors, and means to convert the light energy signals transmitted through said mask into electrical signals.

2. A transmission system according to claim 1 in which the delayed message sample supplied to one set of deflecting means is delayed one sampling interval with respect to the undelayed message sample supplied to the other set of deflecting means.

3. In a transmission system in which the message wave is periodically sampled, encoding means comprising a cathode-ray tube which includes means for producing an electron beam, two sets of deflecting means arranged in space quadrature, and a beam target which comprises a plurality of discrete elements, means at any instant for delaying a message wave sample by at least one sampling interval, means for applying the delayed sample to one set of deflecting means and simultaneously applying an undelayed sample to the other set of deflecting means such that said electron beam is deflected to a particular discrete element on said target corresponding in one coordinate to the amplitude of the undelayed message sample and in another coordinate to the amplitude of the delayed message sample, and means under the control of said discrete elements for deriving at any instant a coded sample which is a measure of the amplitude of the undelayed message sample as conditioned by the amplitude of the delayed message sample.

4. A transmission system according to claim 3 in which said message delay means is arranged to delay the message sample one sampling interval.

5. In a system in which the message wave is periodically sampled for deriving message waves, a plurality of cathode-ray devices each comprising means for producing an electron beam, two sets of deflecting means arranged in space quadrature and a target screen divided into a plurality of discrete areas, means for delaying said message samples different numbers of sampling intervals, means for applying at any instant to one set of deflecting means of one of said devices a sample which has been delayed a first number of intervals and for applying at the same instant to the other set of deflecting means of said one device a sample which has been delayed a second different number of sampling intervals whereby the electron beam of said one device is deflected to a particular discrete area on said screen corresponding in one coordinate to the amplitude of the message sample delayed by the first number of intervals and in another coordinate to the amplitude of the message wave sample delayed by the second number of intervals, means for applying to one set of deflecting means of each of the other of said devices a message sample which has been delayed a third number of sampling intervals and for applying simultaneously to the other set of deflecting means of said other devices an undelayed sample whereby the electron beam in each of said other devices is deflected to a particular discrete area on the target screen corresponding in one coordinate to the amplitude of the sample delayed a third number of sampling intervals and in another coordinate to the amplitude of the undelayed sample, means associated with each discrete area of first said first-mentioned device for energizing one of said last-mentioned other devices, and means for deriving from said particular discrete area on the target screen of that one of said last-mentioned other devices which is energized by said first-mentioned device a coded output whose amplitude is a measure of the amplitude of the undelayed sample as conditioned by the amplitudes of the delayed samples.

6. In a transmission system, at a transmitting point, an encoding means comprising a cathode-ray tube which includes means for producing an electron beam, two sets of deflecting means arranged in space quadrature, and a two-dimensional beam target which comprises a plurality of discrete elements, means for applying an instant sample of a succession of message samples to one set of deflecting plates, means for delaying each sample of said succession by an amount equal to the time between samples, means for applying the delayed sample to the second set of deflecting plates, means for deriving from a discrete element of the target a coded sample, and means for transmitting the coded samples to a receiving point, and, at the receiving point, decoding means supplied with the succession of coded samples for reconstructing therefrom facsimiles of the message samples.

7. In a transmission system in which a message wave is periodically sampled to provide a succession of message samples, at a transmitting point encoding means comprising a cathode ray tube which includes means for forming an electron beam, two sets of deflecting means arranged in space quadrature, and a two-dimensional beam target which comprises a plurality of discrete elements, means for delaying each of the succession of samples one sampling interval, means for applying a delayed sample to one set of deflecting means and an undelayed sample to the other set of deflecting means such that the electron beam is deflected to the particular element on the target screen corresponding in one dimension to the amplitude of the undelayed sample and in the other dimension to the amplitude of the delayed sample, means controlled by said particular element for providing a coded sample characteristic of the amplitude of an undelayed sample as conditioned by the amplitude of its immediately preceding sample, and, at a receiving point decoding means supplied with the coded samples for reconstructing a facsimile of the message wave.

8. In a transmission system, at the transmitting terminal, non-linear encoding means to be supplied with a message wave comprising first means supplied at each instant with the amplitude of an instant sample of the message wave, second means supplied at each instant with the amplitude of a sample of the message wave preceding the instant sample, weighting means variant with the amplitudes of the samples supplied said first and second means, and output means providing at each instant a code sample whose amplitude is determined by said weighting means, and means for transmitting said code samples, and, at the receiving terminal, means for receiving said transmitted code samples and forming therewith a facsimile of the message wave.

9. In a transmission system, at the transmitting terminal, encoding means comprising means for sampling a message wave and deriving wave samples, weighting means supplied with the wave samples and including a plurality exceeding two of control means, means for applying each of a plurality exceeding two of wave samples preceding an instant sample to a different one of said control means for controlling the weighting characteristic of said weighting means in accordance with their amplitude, and means for deriving for transmission for each instant sample a code sample in accordance with the weighting characteristic applied, and, at the receiving terminal, decoding means supplied with the code samples for producing a facsimile of the message wave.

10. The method of transmission which includes the steps of sampling the message wave for deriving a succession of samples, detecting the amplitudes of samples which precede an instant sample, utilizing the amplitudes of such preceding samples to select electrically a particular coding function from a series of coding functions for the instant sample, transmitting code samples which are a measure of the instant samples as modified by the particular coding characteristic, receiving the transmitted code samples, and forming a facsimile of the message wave therefrom.

References Cited in the file of this patent

UNITED STATES PATENTS

| | | |
|---|---|---|
| 2,199,066 | Bernstein | Apr. 30, 1940 |
| 2,330,604 | Messner | Sept. 28, 1943 |
| 2,387,018 | Hartley | Oct. 16, 1945 |
| 2,455,532 | Sunstein | Dec. 7, 1948 |
| 2,462,860 | Grieg | Mar. 1, 1949 |
| 2,477,615 | Isbister | Aug. 2, 1949 |
| 2,489,883 | Hecht | Nov. 29, 1949 |
| 2,510,054 | Alexander et al. | June 6, 1950 |
| 2,522,291 | Morrison | Sept. 12, 1950 |
| 2,553,605 | Ransom | May 22, 1951 |
| 2,568,721 | Deloraine | Sept. 25, 1951 |

OTHER REFERENCES

Encyclopedia on Cathode-Ray Oscilloscopes and Their Uses, Rider-Uslam, pages 442–443.